United States Patent [19]

Mueller

[11] 4,254,232

[45] Mar. 3, 1981

[54] POLYGLUTARIMIDES

[75] Inventor: Donald S. Mueller, Newtown, Pa.

[73] Assignee: Rohm and Haas Company, Philadelphia, Pa.

[21] Appl. No.: 967,663

[22] Filed: Dec. 8, 1978

[51] Int. Cl.³ .................. C08L 51/02; C08L 79/00
[52] U.S. Cl. ............................ 525/66; 525/64; 525/67; 525/68; 525/69; 525/96; 525/149
[58] Field of Search ............ 260/873; 525/146, 149, 525/64, 66, 67, 68, 69, 96

[56] References Cited

U.S. PATENT DOCUMENTS 3,130,177  4/1964  Grabowski ..................... 260/873
3,162,695  12/1964  Grabowski ..................... 260/873

FOREIGN PATENT DOCUMENTS 848486  5/1977  Belgium ..................... 260/876 R Primary Examiner—J. Ziegler
Attorney, Agent, or Firm—Michael B. Fein

[57] ABSTRACT

Compositions having high notched Izod impact strength and Gardner VHIT impact value are achieved by blending polyglutarimides, multiple stage polymers based on butadiene or acrylates, and polycarbonate in a weight ratio such that the polycarbonate comprises about 12 to 25% of the blend.

8 Claims, No Drawings

POLYGLUTARIMIDES

BACKGROUND OF THE INVENTION

DESCRIPTION OF THE PRIOR ART

Kopchik has disclosed in Belgian Pat. No. 848,486 of May 18, 1977 certain novel polyglutarimides prepared by a novel process and having improved properties over any previous polyglutarimides.

For many applications for engineering thermoplastics, impact strengths as measured by the notched Izod and the Gardner VHIT tests must meet certain standards. One benchmark is a product of the General Electric Company sold under the trademark Noryl 731 and comprised of a polyphenylene oxide and polystyrene blend, having a notched Izod of 3 and a Gardner VHIT of 100 inch-pound at 25° C.

Although Kopchik did disclose that impact modifiers can be used in his novel polyglutarimides to improve their impact strength, no one prior to my invention was able to achieve an impact strength in polyglutarimides equivalent to the Noryl 731 benchmark for impact strength.

Therefore, it is an object of the present invention to improve the notched Izod and Gardner VHIT impact strengths of polyglutarimides so as to make them competitive with other engineering thermoplastics.

A further object is to provide improved polyglutarimides.

A still further object is to provide a process for achieving improved polyglutarimides.

SUMMARY OF THE INVENTION

These objects, and other as will become apparent from the following disclosure, are achieved by the present invention which comprises blending polyglutarimides with minor amounts of an acrylate-based or butadiene-based impact modifier and a polycarbonate resin in a weight ratio such that the polycarbonate comprises about 12 to 25% of the blend.

DETAILED DESCRIPTION OF THE INVENTION AND THE PREFERRED EMBODIMENTS

The polyglutarimides to be used in this invention are any known in the art, but the ones produced in accordance with the aforementioned Kopchik Belgian patent are so superior to any other known to me that they are greatly preferred.

The preferred glutarimide polymers are those which have been prepared from acrylic polymers such as poly(methyl methacrylate) and copolymers thereof by reaction in accordance with the aforementioned Kopchik invention with ammonia or methyl amine so that about 1 to about 100% of the acrylic ester groups are imidized. The optimum results are obtained with degrees of imidization of about 20 to 60%. The weight average molecular weights of the glutarimide polymers are typically about 100,000 to 200,000.

The butadiene- or acrylic-based multiple stage polymer can be any of the ones already known for impact modifying PVC.

The butadiene-based multiple stage polymer can be an MBS (methacrylate-butadiene styrene) type or an ABS (acrylonitrile-butadiene-styrene) type. For example, multiple stage polymers having a butadiene-styrene first stage, a styrene second stage, and a methyl methacrylate-styrene final stage or an acrylonitrile-styrene final stage can be used.

The acrylic-based multiple stage polymer can have a crosslinked butyl acrylate first stage and a methyl methacrylate final stage.

Ratios of rubber stage to hard stage can be varied from about 1:1 to about 9:1.

Suitable amounts of butadiene- or acrylic-based multiple stage polymer are typically about 5 to 40% by weight of the ternary blend. Preferably about 15 to 35% of the ternary blend is the multiple stage polymer.

I have discovered that surprisingly and unexpectedly the level of polycarbonate in the blend is critical for obtaining the desired notched Izod impact strength of greater than 3 and Gardner VHIT impact value about 100 inch-pounds at 25° C. Although it is possible to obtain either of the two impact properties with other compositions and ratios, it is only when the polycarbonate comprises at least 12 percent by weight of the blend, based on weight of polyglutarimide, multiple stage polymer, and polycarbonate, that both of the two impact properties are achieved. Upper limits of polycarbonate are not critical and are governed primarily by economics. Usually no more than about 25% polycarbonate is cost-beneficial.

The polycarbonates which can be employed are any having a molecular weight (weight average) of at least about 20,000 up to about 1,000,000. Preferred molecular weights for the polycarbonate are about 20,000 to 40,000. Polycarbonates are well known commercially available materials.

The polyglutarimide comprises about 20 to 80% of the blend, preferably about 20 to 60%, and more preferably 30 to 60% of the weight of the three components.

The polyglutarimide is a thermoplastic polymer containing imide units of the formula

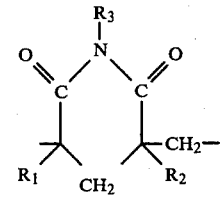

wherein $R_1$, $R_2$, and $R_3$ independently represent hydrogen or $C_1$ to $C_{20}$ unsubstituted or substituted alkyl, aryl, or mixtures thereof.

The polyglutarimide can be comprised of two polymers containing glutarimide units, the first having a Vicat value above about 170° C. and the second having a Vicat value below about 160° C., the weight ratio of said two polymers being between about 1:2 and 2:1.

The polycarbonate, polyglutarimide, and multiple stage polymer are blended by melting to form an alloy. Generally the ingredients are dry blended with suitable stabilizers, pigments, fillers, reinforcing agents, or other additives, and then the blend is extruded at an elevated temperature, e.g., around 450° to 550° F., and the resultant melt blend can either be fed directly to an injection molding machine, or cooled and granulated for subsequent processing.

I have discovered that there is a synergistic improvement in impact strength achieved by the combined incorporation of the multiple stage polymer and the polycarbonate at a level of at least 12% which is not achieved in polyglutarimide by incorporation of either the multiple stage polymer alone or the polycarbonate alone or at other levels of polycarbonate incorporation.

EXAMPLE 1

Polyglutarimide prepared in accordance with Kopchik Belgian Pat. No. 848,486 and having a Vicat softening point of 168° to 172° C. was blended at different ratios in a Killion extruder, using screw type 6A and zone temperatures 440°, 460°, 470°, and 470° F., respectively, with polycarbonate and an MBS multiple stage polymer having a butadiene-based first stage comprising 75% by weight of the multiple stage polymer to produce Blends A, B, and C as set forth below.

Blend A was 39% polyglutarimide, 41% multiple stage polymer, and 20% polycarbonate. Blend B was 56% polyglutarimide, 34% multiple stage polymer and 10% polycarbonate. Blend C was 59% polyglutarimide and 41% multiple stage polymer. Blend C has no polycarbonate.

The notched Izod impact strength at 25° C. for the three blends was A=3.31 ft.—lb./in., B=1.69 ft.—lb./in., and C=0.86 ft.—lb./in.

The Gardner VHIT impact strength at 25° C. was A=120 in.—lbs., B=15 in.—lbs., and C=20 in.—lbs.

I claim:
1. Composition comprising a blend of
   (a) a thermoplastic polyglutarimide polymer containing units of the formula

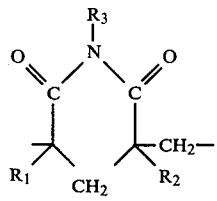

wherein $R_1$, $R_2$, and $R_3$ independently represent hydrogen or $C_1$ to $C_{20}$ unsubstituted or substituted alkyl, aryl, or mixtures thereof,
   (b) a multiple stage polymer having a first stage polymerized from a predominantly butadiene or alkyl acrylate monomer system, and
   (c) polycarbonate,
   wherein the polycarbonate comprises about 12 to 25% by weight of said blend, the polymer containing imide units comprises about 20 to 80% by weight of said blend, and the notched Izod impact strength of the composition is greater than 3 ft. lbs./in. at 25° C.

2. Composition of claim 1 wherein the Gardner impact VHIT value is at least 100 in.—lbs. at 25° C.

3. Composition of claim 1 wherein component (a) is comprised of two polyglutarimide polymers, the first having a Vicat value above about 170° C. and the second having a Vicat value below about 160° C., the weight ratio of said two polymers being between about 1:2 and 2:1.

4. Composition of claim 1 wherein the multiple stage polymer (b) is selected from the group consisting of methacrylate-butadiene-styrene and acrylonitrile-butadiene-styrene polymers.

5. The composition of claim 1 wherein the multiple stage polymer (b) has a crosslinked butyl acrylate polymer first stage and a methyl methacrylate final stage.

6. Composition of claim 1 wherein multiple stage polymer (b) has a rubbery first stage and a hard final stage, and the ratio of rubbery first stage to hard final stage is about 1:1 to 9:1.

7. Composition of claim 1 wherein component (c) has a weight average molecular weight of about 20,000 to 1,000,000.

8. Method of improving the notched Izod impact strength and Gardner impact value of thermoplastic polyglutarimide polymers comprising blending therewith a butadiene-based or an acrylate-based multiple stage polymer and a polycarbonate, in a weight ratio such that the polycarbonate comprises about 12 to 25% of the resultant blend.

* * * * *